(12) United States Patent
Gorzel et al.

(10) Patent No.: US 11,704,087 B2
(45) Date of Patent: Jul. 18, 2023

(54) VIDEO-INFORMED SPATIAL AUDIO EXPANSION

(71) Applicant: GOOGLE LLC, Mountain View, CA (US)

(72) Inventors: Marcin Gorzel, Dublin (IE); Balineedu Adsumilli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 511 days.

(21) Appl. No.: 16/779,921

(22) Filed: Feb. 3, 2020

(65) Prior Publication Data

US 2021/0240431 A1 Aug. 5, 2021

(51) Int. Cl.
*G06F 3/16* (2006.01)
*G10L 25/51* (2013.01)
*G06V 20/40* (2022.01)
*H04S 5/00* (2006.01)

(52) U.S. Cl.
CPC .............. *G06F 3/165* (2013.01); *G06V 20/41* (2022.01); *G10L 25/51* (2013.01); *H04S 5/005* (2013.01)

(58) Field of Classification Search
None
See application file for complete search history.

(56) References Cited

U.S. PATENT DOCUMENTS

| 9,888,333 B2 * | 2/2018 | Zurek ..................... H04S 3/008 |
| 2003/0053680 A1 | 3/2003 | Lin et al. |
| 2005/0281410 A1 * | 12/2005 | Grosvenor ............. H04H 60/47 381/61 |
| 2014/0233917 A1 | 8/2014 | Xiang |
| 2014/0314391 A1 * | 10/2014 | Kim ....................... G11B 27/34 386/248 |
| 2015/0245133 A1 * | 8/2015 | Kim ........................ G10L 21/02 381/92 |
| 2016/0005435 A1 * | 1/2016 | Campbell .......... H04N 5/23238 386/240 |
| 2016/0337776 A1 * | 11/2016 | Breebaart ............. G10L 19/008 |
| 2017/0215005 A1 * | 7/2017 | Hsu ......................... G06F 3/165 |
| 2017/0249973 A1 | 8/2017 | Antonellis et al. |
| 2017/0293461 A1 * | 10/2017 | McCauley ............... H04S 7/30 |
| 2019/0243530 A1 * | 8/2019 | De Ridder .......... G06F 3/04815 |
| 2020/0312347 A1 * | 10/2020 | Mate ...................... H04S 7/303 |

OTHER PUBLICATIONS

International Search Report and Written Opinion of International Application No. PCT/US2020/055964 dated Jan. 29, 2021.

(Continued)

*Primary Examiner* — Christopher J Fibbi

(74) *Attorney, Agent, or Firm* — Young Basile Hanlon & MacFarlane, P.C.

(57) ABSTRACT

Assigning spatial information to audio segments is disclosed. A method includes receiving a first audio segment that is non-spatialized and is associated with first video frames; identifying visual objects in the first video frames; identifying auditory events in the first audio segment; identifying a match between a visual object of the visual objects and an auditory event of the auditory events; and assigning a spatial location to the auditory event based on a location of the visual object.

20 Claims, 8 Drawing Sheets

(56) References Cited

OTHER PUBLICATIONS

Weitnaur et al.; "Object-based Audio, the future of audio production, delivery and consumption"; https://lab.irt.de/demos/object-based-audio/; 2018; pp. 1-5.
https://en.wikipedia.org/wiki/Surround_sound; Jan. 2020; pp. 1-12.
https://en.wikipedia.org/wiki/Ambisonics; Sep. 2019; pp. 1-12.
"Immersive Sound and Object-Based Audio and Microphones"; Nov. 2019; 18 Pages.
"Multichannel sound technology in home and broadcasting applications"; Report ITU-R BS.2159-4; May 2012; pp. 1-54.
Makino et al.: "Blind Audio Source Separation based on Independent Component Analysis"; NTT Communication Science Laboratories, Kyoto, Japan; Apr. 2003; pp. 1-35.
Hawksford, Malcolm J.; "Diffuse Signal Processing and Acoustic Source Characterization for Applications in Synthetic Loudspeaker Arrays"; http://www.aes.org/e-lib/browse.cfm?elib=11405; Apr. 2002; 4 Pages.
Vision AI; https://cloud.google.com/vision; Feb. 2020; pp. 1-15.

\* cited by examiner

VIDEO-INFORMED SPATIAL AUDIO EXPANSION

TECHNICAL FIELD

This disclosure relates to spatial audio and more specifically to obtaining spatial audio information from non-spatialized audio recordings.

BACKGROUND

In life, a typical setting (e.g., scene) includes multiple different auditory events. An auditory event can be thought of as a sound that has a source (i.e., a producer or generator of the sound) and a direction (i.e., the direction from which the sound is heard). An ambient sound (i.e., a diffuse sound) does not initiate from a specific direction.

Auditory events can include speech, music and musical instruments (e.g., piano, violin, concert, cello, etc.), natural sounds (e.g., rain, wind, thunder, etc.), human emotions (e.g., crying, laughing, cheering, etc.), animal vocalization (e.g., roaring, purring, etc.), other artifact (e.g., explosions, cars, and door bells), and so on.

A video recording of the typical setting includes all (or at least most) of the auditory events of the setting. The video recording may be obtained using any number of recording devices, which can range from a simple handheld held mobile device (e.g., a smart phone) to sophisticated recoding equipment (e.g., a spherical or 360° cameras). Some recording devices may not be able to capture spatial audio information (e.g., the directions and/or locations of the audio events included in the recording.

So that a recording of a setting may is played back in such a way so as to mimic the way the setting would have been heard (e.g., experienced) in real life, it is desirable that spatial audio information be derived (e.g., extracted, identified, etc.) for those recordings that do not include spatial audio information.

SUMMARY

Disclosed herein are implementations of video-informed spatial audio expansion.

A first aspect is a method of assigning spatial information to audio segments. The method includes receiving a first audio segment that is non-spatialized and is associated with first video frames; identifying visual objects in the first video frames; identifying auditory events in the first audio segment; identifying a match between a visual object of the visual objects and an auditory event of the auditory events; and assigning a spatial location to the auditory event based on a location of the visual object.

A second aspect is a method of assigning spatial information to audio events in a video. The method includes demultiplexing the video to obtain an audio track and video frames; assigning respective visual labels to visual objects in the video frames; separating the audio track into multiple tracks; assigning respective audio labels to the multiple tracks; automatically matching some of the respective audio labels to some of the visual labels; and assigning respective spatial locations to the some of the respective audio labels based on respective locations of the some of the visual objects.

A third aspect is a system for assigning spatial information to audio segments. The system includes a memory and a processor. The processor is configured to execute instructions stored in the memory to: receive a first audio segment that is non-spatialized and is associated with first video frames; identify visual objects in the first video frames; identify auditory events in the first audio segment; in response to identifying a match between a visual object of the visual objects and an auditory event of the auditory events, assign a spatial information to the auditory event; and, in response to not identifying the match, assign the auditory event to a diffuse sound field.

These and other aspects of the present disclosure are disclosed in the following detailed description of the embodiments, the appended claims and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
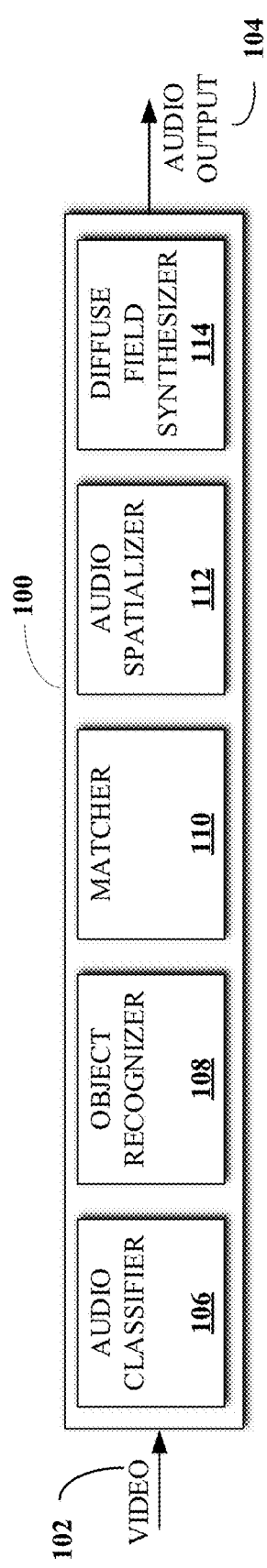
FIG. 1 is a diagram of an example of a system for spatializing audio information according to implementations of this disclosure.

Some video recordings of a scene can include spatial audio information of auditory events. For example, in spherical videos, auditory events usually originate from directions corresponding to the visual objects or events that produce (e.g., generate) the auditory events. High-resolution and/or high-accuracy spatial audio representation can be achieved using one of several available approaches. Examples of such approaches include object-based, channel-based, and scene-based approaches.

In the object-based approach, each audio event can be represented as an object using the audio data (e.g., monophonic audio recording) along with the metadata specifying spatial location of the event (among other parameters). In the channel-based approach, a number of audio events can be planned between groups of loudspeakers (e.g., 2 or 3 loudspeakers) in a (most typically) horizontal-only or (less commonly) with-height loudspeaker configuration, using chosen time/intensity-based panning law. In the scene-based approach, an infinite resolution sound field resulting from an arbitrary number of audio events can be truncated into a final spatial resolution and represented with a finite number of basis functions. For example, Higher Order Ambisonics (HOA) uses spherical harmonic functions as basis functions to represent a finite resolution acoustic pressure distribution on a sphere around a listener. This approach decouples the sound field representation from the final reproduction setup, inherent in the channel-based approach.

Each of the above approaches can have specific shortcomings associated with at least one of the capture, production, storage and/or reproduction of spatial audio content.

For example, in the object-based approach, each audio event should ideally be captured and stored separately. Capture can be equivalent to spot recording of individual events and assigning to the auditory events their spatial properties during post-production. Object-based audio is decoupled from the final reproduction stage and requires that each object be spatialized separately, thereby resulting in a high reproduction complexity.

For example, in the channel-based approach, the audio can be recorded with a dedicated multi-microphone setup; alternatively, spot recordings can be used. In the case of spot recordings, all the audio events can be pre-mixed to a dedicated channel format, such as described in "Multichannel sound technology in home and broadcasting applications," ITU-R BS.2159.4, [retrieved on 2019 Dec. 27]. Retrieved from the Internet <URL https://www.itu.int/dms_pub/itu-r/opb/rep/R-REP-BS.2159-4-2012-PDF-E.pdf>. Although the storage cost can be limited by the number of channels used and the rendering complexity can be low, the spatial resolution can also be limited by the physical availability of loudspeakers in given spatial areas. Additionally, the content mixed for a specific loudspeaker setup can usually be incompatible with other loudspeaker setups.

For example, in the scene-based approach, such as using Ambisonics (an asymptotically-holophonic technique for capturing, storing and reproduction of audio), the spatial resolution of an encoded sound field can match the resolution of the original sound field as the spherical harmonic expansion of a sound field approaches infinity. However, the cost of capturing, storing and reproducing sound fields can depend on the desired spatial resolution (for example, a spatial resolution that is scalable). For example, First Order Ambisonics (FOA) requires 4 coefficients (i.e., channels of audio). A high-resolution sound field representation (e.g., HOA) requires 9, 16, or more coefficients (i.e., channels of audio).

From the point of view of capture, FOA is widely accessible because it requires a low channel count. For example, 4-channel microphone arrays are common for FOA. HOA is more difficult to capture: state-of-the-art capture of HOA spherical arrays can use 32 channels of audio.

From the point of view of production, audio events from spot recordings (e.g., monophonic recordings) can be encoded into an FOA/HOA representation (analogously to the object-based and channel-based approaches) where an Ambisonic encoder can be used in place of a time/intensity-based panning law. Thus, the storage costs can depend on the chosen sound field resolution.

As mentioned above, some video recordings of a scene may not contain spatial audio information. Such recordings are referred to herein as monophonic recordings and may be captured using a single microphone or using a hand-held device, such as a smartphone. Monophonic recordings are common, especially among casual video producers or prosumers. Monophonic recordings do not have the equipment restrictions of the more complex channel-based or scene-based setups.

In contrast to the approaches described above, a monophonic recording lacks any spatial audio information. A monophonic recording contains a monophonic downmix of a number of directional sound sources and diffuse events and/or ambiance. Thus, for example, when recording audio to accompany a video using a handheld device, such as a smartphone, all the auditory spatial information is typically irrecoverably lost. Also, since the monophonic recording already contains a mix of directional and non-directional sound sources, it cannot be used in the object-based approach.

To illustrate, a setting may include a crying girl (who is visible), a barking dog (which is also visible), a football match playing on a television (which is visible), a mother in an adjacent room (i.e., out of view) singing, and the sound of thunder. A monophonic recording (i.e., a video recording that includes monophonic sound) would include all these sounds. However, the recording would not include any spatial information regarding each of these sounds. For example, the recording would not capture that the location of the crying auditory event is in the center of image; that the barking auditory event originates from the left side of the image, where the dog is laying close to a wall; and that the singing is coming from the right side of the image.

As used herein, a sound (i.e., an auditory event) that originates from an object (e.g., a person, a vehicle, etc.) whether visible or not visible in a frame (e.g., image) of the video is referred to herein as directional sound. A sound that does not come from a specific direction (e.g., rain, thunder, etc.) is referred to herein as diffuse (or ambient) sound. All diffuse sounds of an audio segment are referred to as the diffuse sound field.

Implementations according to this disclosure utilize both audio and visual features (spatial and temporal) in a video in order to retrieve (e.g., heuristically retrieve) the spatial audio information lost during the monophonic downmix process (i.e., the monophonic audio capture using, for example, a smartphone). That is, visual (i.e., image and/or moving image) information in a video can be used to retrieve (e.g., reconstitute, estimate, etc.) the missing spatial audio information.

Machine vision (e.g., image and/or object recognition) combined with machine hearing techniques (e.g., audio classification) can be used to retrieve (e.g., derive, reconstitute, build, etc.) the spatial audio information. In some examples, user assistance can be combined with the machine vision and/or the machine hearing techniques to retrieve the audio-visual scene information. The user assistance can be used to inform the selection and extraction of both directional and diffuse auditory events. The retrieved spatial information can subsequently be used to re-encode the auditory events into their original directions, as well as synthesize the diffuse sound field and/or ambiance.

It is noted that, while monophonic recordings are described herein, the term, as used, also encompasses recordings that do not contain, or contain limited, spatial information. That is, the teachings herein apply to video recordings that do not include (e.g., are not associated with) sufficient spatial audio information (i.e., "non-spatialized audio information"). For example, stereo recordings have limited spatial information, which is typically limited to an arc between two loudspeakers or a line between a left/right headphone. For example, in stereo recordings, sound objects that were at the back of a scene may be audible in the front; sound objects that were above the user may be on the horizontal plane; and so on. Consequently, the original locations of some directional sound sources may often be misrepresented in a stereophonic sound field.

A monophonic audio track contains no spatial information about sound sources present in the audio track. When presented over a loudspeaker array, all sound sources originate from a single loudspeaker (to which the audio track has been assigned) or duplicated onto multiple loudspeakers. In the latter scenario, the location of the sound sources may be altered due to the time/intensity panning law hence the source may appear to originate from locations in between multiple speakers. However, all the sound sources present in the audio stream are expected to originate from the same location, even if they were spatially separated in the original sound field. If presented over headphones, all the sound sources will originate from within the listener's head.

On the other hand, a stereophonic audio track contains very limited information about sound sources present in the original sound field. Usually, the respective locations of sound sources is limited to a 60 degree arc when presented using two standard stereo loudspeakers. When presented over headphones, the sources may be lateralized either to the left or the right ear (or anywhere in between). As such, in stereophony, the 360 spatial representation of sound sources originating from a spherical sound field is collapsed to a 1D representation.

Thus, to reiterate, as pertains to this disclosure, stereophonic recordings can not be said to contain spatial audio information and the term "monophonic audio" encompasses both monophonic and stereophonic audio, and more generally, any recoding that does not include spatial audio information.

FIG. 1 is a diagram of an example of a system 100 for spatializing audio information according to implementations of this disclosure. Spatializing audio information means adding spatial information to audio events. The system 100 receives a video 102 and outputs an audio 104 that includes spatial information. The video 102 includes images (e.g., frames, moving images, etc.) and auditory events. The video 102 can be a video file (e.g., a previously recoded and stored video file), a video stream, and the like. The auditory events are non-spatialized. That is, no spatial information is available with respect to the auditory events of the video.

The video 102 can be a multi-view video. That is, the video 102 can be a setting that is captured from different points of view using multiple cameras or using an omnidirectional camera. As such, the video 102 can be a spherical video, a 360° video, a panoramic video, or the like. The video 102 can be a single-view-camera video.

The system 100 can use the images of the video and the sounds captured (e.g., included, etc.) in the video to output (e.g., obtain, assign, determine, calculate, estimate, etc.) spatial information for the sounds.

The system 100 can include an audio classifier 106, an object recognizer 108, a matcher 110, an audio spatializer 112, and a diffuse field synthesizer 114. Other implementations of the system 100 can include more, fewer, other modules, or a combination thereof.

For example, the diffuse field synthesizer 114 may not be included in the system 100. For example, the system 100 can include a user interface module. Through the user interface module, a user can identify unrecognized objects in the images (i.e., objects that are not identified or classified by the object recognizer 108), the user can identify unrecognized sounds (i.e., auditory events that are not identified or classified by the audio classifier 106), the user can match unmatched (i.e., unmatched or incorrectly matched by the matcher 110) auditory events to objects, the user can perform other actions, or a combination thereof. In another example, some aspects (e.g., functionalities, capabilities, etc.) of the user interface module can be implemented in, or be part of, other respective modules. The system 100 can include a demultiplexing module that can split the video 102 into its constituent video steam and audio stream.

Figure 2:
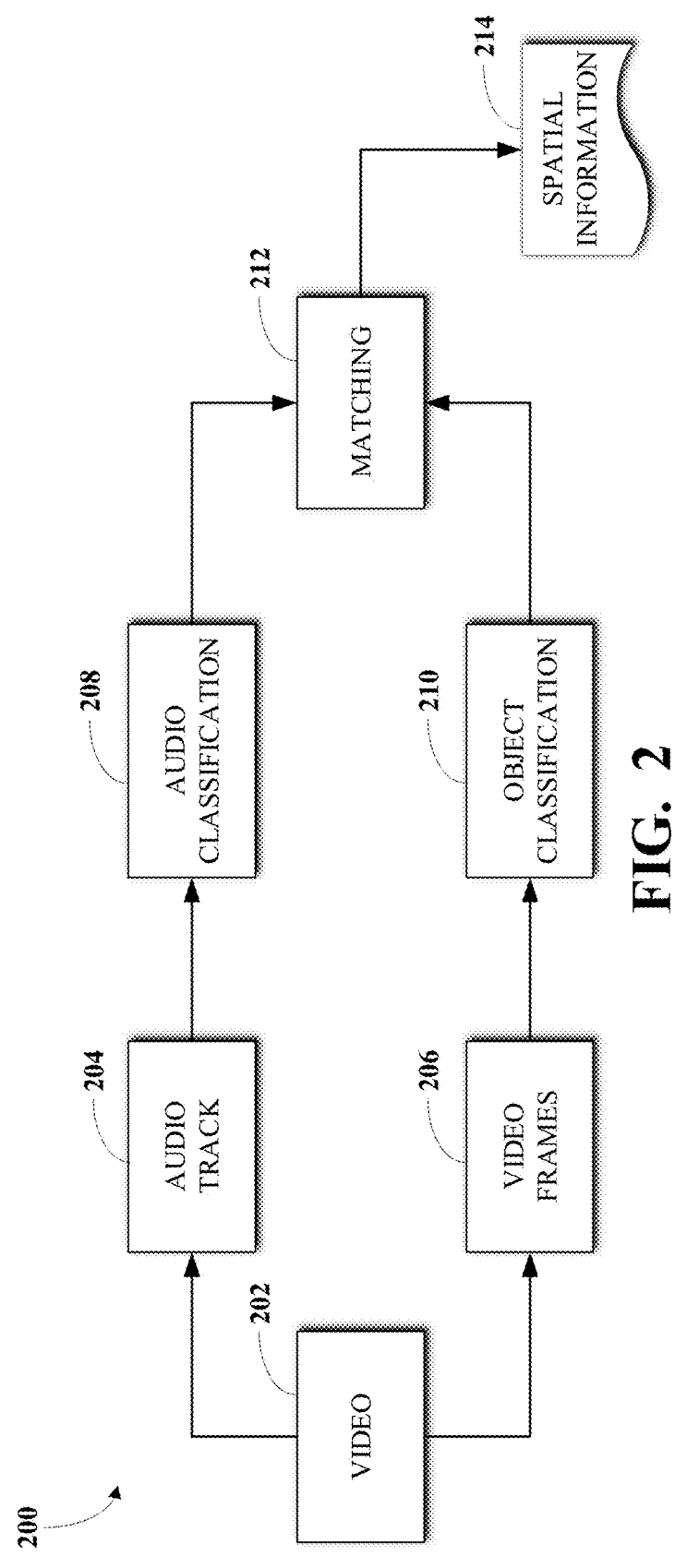
FIG. 2 is a flowchart of an example of a technique for spatializing audio according to implementations of this disclosure.

The modules of the system 100 are described in conjunction with FIG. 2.

FIG. 2 is a flowchart of an example of a technique 200 for spatializing audio according to implementations of this disclosure. Given a monophonic downmix of directional audio events and diffuse audio events in a sound field, as well as a visual representation (which can, but need not be, a spherical/360°) of the audio events, the technique 200 retrieves (e.g., estimates, etc.) the spatial audio information of the auditory scene, which are lost in the mono downmixing or mono recording process. The extracted auditory events can then be spatially expanded (i.e., upmixed) into an arbitrary spatial representation.

A video 202 is received by the technique 200. The video 202 can be as described with respect to the video 102 of FIG. 1. An audio track 204 of the video 202 is input to an audio classification 208, which can be performed by the audio classifier 106 of FIG. 1. The audio classification 208 identifies audio sounds in the audio track 204. Video frames 206 of the video 202 are input to an object classification 210, which can be performed by the object recognizer 108 of FIG. 1. The object classification 210 identifies visual objects (i.e., objects that are seen) in the video frames.

In an example, a demultiplexing module can split the video 202 into its constituents (i.e., the audio track 204 and the video frames 206). In another example, the audio classifier 106 of FIG. 1, or another module, can extract the audio track 204 from the video 202; and the object recognizer 108, or another module, can extract the video frames 206 from the video 202.

In an example, the video 202 can be processed by the technique 200 in chunks (i.e., segments). That is, the video 202 can be split into segments. Each segment can include a number of frames and corresponding audio segments. As such, the audio track 204 can be the audio segment of a chunk; and the video frames 206 can be the frames of the chunk.

For example, assuming that the segments are each 5 seconds in length, and that the video was captured at a frame rate of 30 frames per second, then each segment would include 150 frames and the corresponding 5 seconds of audio. The segments can have varying sizes (i.e., lengths). In an example, each segment can correspond to a scene of the video 202. For example, the video 202 can be processed by a scene detection module (not shown) to identify the scenes in the video 202. In the example of a spherical video, each chunk can correspond to a change in camera location.

Figure 3:
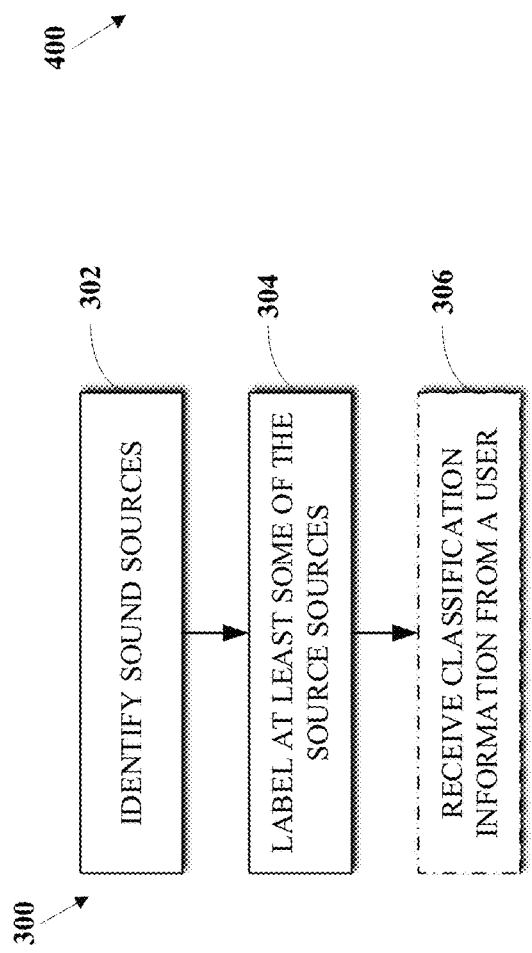
FIG. 3 is a flowchart of an example of a technique for audio classification according to implementations of this disclosure.

The audio classification 208 is described with respect to FIG. 3. FIG. 3 is a flowchart of an example of a technique 300 for audio classification according to implementations of this disclosure. The technique 300 can be implemented by the audio classification 208 of FIG. 2 or by the audio classifier 106 of FIG. 1.

The technique 300 includes identifying the different sound sources in the audio track 204, 2), labeling each (or at least some of the) extracted audio source, and 3) optionally receiving classification information from a user.

At 302, the technique 300 identifies the different sound sources in an audio track, such as the audio track 204 of FIG. 2. The different sound sources can be identified using any number of available source separation techniques. The sources are separated so that they can be subsequently re-combined (i.e., upmixed) as further described below.

Source separation may be based on analysis of different audio data representations (e.g., audio spectrograms). In an example, Blind Audio Source Separation (BASS), which is a source separation technique, can be used. BASS receives, as input, a mixed signal (i.e., a downmixed audio track) and extracts individual sound sources from the downmixed audio track. Stated differently, BASS aims to extract original sound sources from mixed ones. Underlying BASS is an assumption that the individual sound sources were mixed according to an unknown function to generate the downmixed audio track. BASS estimates the mixing function using the observed (i.e., in the downmixed audio track) mixed signals.

For example, given a mono recoding of two persons where one is playing a violin and the other is playing a piano, BASS can identify that there are two audio sources (i.e., two audio objects) in the recording. BASS may not be able to specifically identify that the first audio source is a violin and that the second audio source is a piano.

At 304, the technique 300 labels at least some of the extracted audio sources. That is, a label (i.e., an identification, a human readable string, a semantic string, etc.) is assigned to each of the at least some of the extracted audio sources. In an example, audio classification can be used. Each of the extracted audio sources can be (e.g., separately) presented for audio classification. The audio classification outputs information regarding the identity of the audio source. In an example, the audio classification can be a machine learning model that has been trained to classify sound samples. That is, given a sound sample, a classification label (e.g., a human readable semantic description) of the sound source of the sound sample is output.

In an example, the audio classification can output probability ratings indicating what the object (i.e., the audio source) might be. For example, when presented with the sound sample of the sound source that is the violin, the audio classification 208 may output that the object is a violin with an 80% probability, that it is a viola with 15% probability; and that it is a cello with a 2% probability. In an example, the audio classification 208 can output only a most probable (i.e., a best guess) object type. For example, the audio classification can simply output "violin." In some examples, the audio classification may not be able to identify the object. For example, the audio classification can output "unknown" (or some other label indicating that the audio sample could not classified).

At 306, the technique 300 can optionally receive classification information from a user. For example, the technique 300 can, in a user interface, present to the user the list of identified and unidentified sound sources. In the user interface, the user can select a label of a sound source and play the associated (e.g., identified) sound. The user can modify to labels assigned to some of the identified sound sources. To illustrate, a sound source may be identified as a "violin" when in fact it is a viola. Thus, the user can modify the label associated with the sound source to "viola." The user can assign labels to unidentified sound sources. To illustrate, the piano sound source may not have been identified and was thus assigned the label "unknown." The user can change the label "unknown" to "piano."

Figure 6:
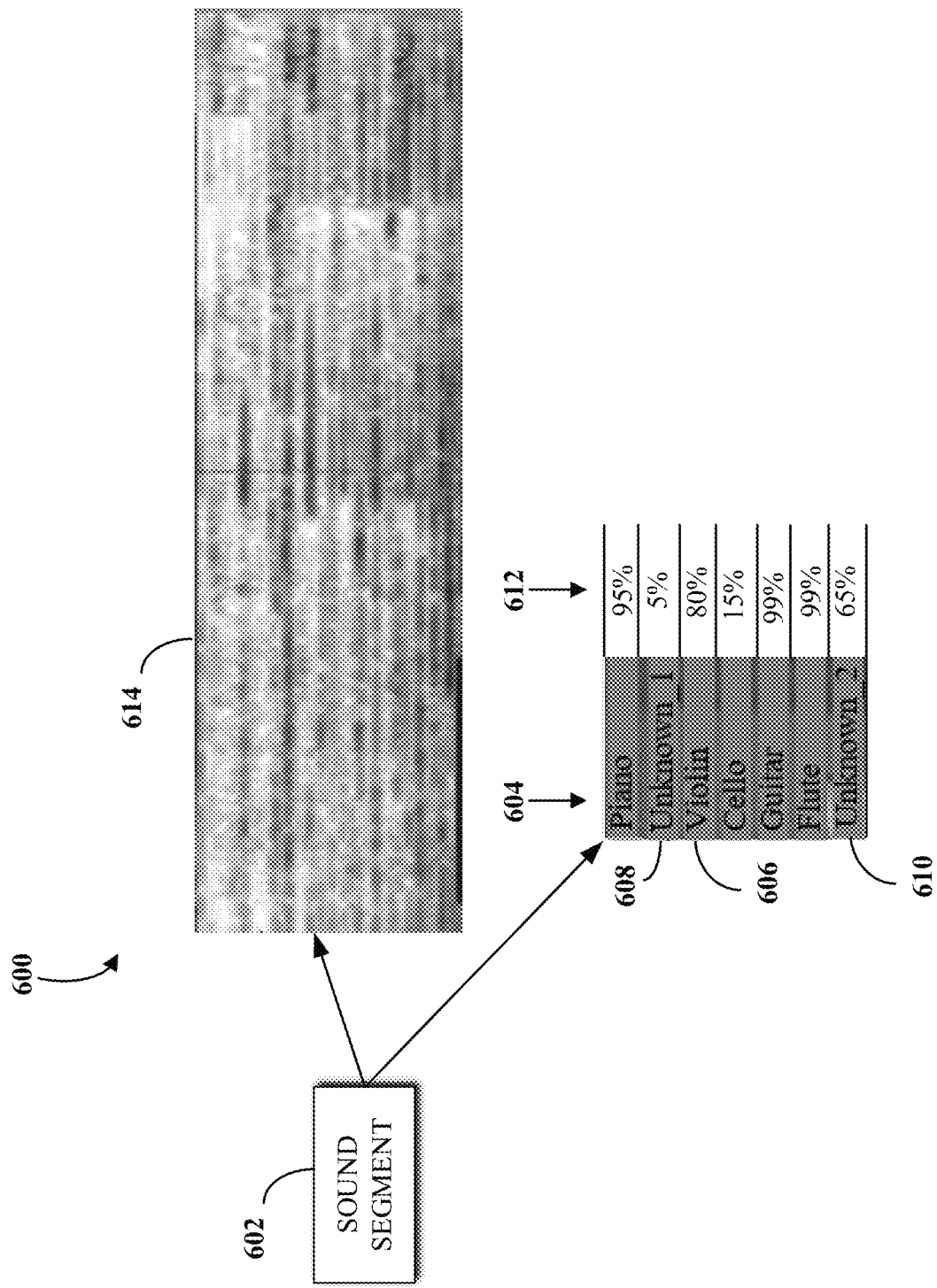
FIG. 6 is an example of a user interface showing sound source classification information.

FIG. 6 is an example of an user interface 600 showing sound source classification (i.e., identification) information. The user interface 600 can be presented by the technique 300 at 306. The user interface 600 illustrates that an audio segment 602 (e.g. a mono audio clip) of a concert was presented to the technique 300. Labels 604 can be output and assigned to at least some of the sound sources identified (such as using source separation) in the audio segment. In an example, a spectrogram 614 can display the spectrum of frequencies of the audio clip as the spectrum varies with time. The user interface 600 illustrates that a sound source 606 is a "Violin." In an example, respective certainty indicators 612 (e.g., confidence levels) can be associated with the classification of each of the sound sources. The user interface 600 also illustrates that a sound source 608 and a sound source 610 were not identified. Thus, default labels (e.g., "Unknown_1" and "Unknown_2") were assigned to the unidentified sound sources.

In other examples, the user interface 600 can include fewer, more, other user controls and/or information, or a combination thereof. For example, the user interface 600 can include, adjacent to each of the labels 604, a representative image illustrating the sound source. For example, the user interface 600 can include controls allowing the user to play, rewind, fast forward, or pause the audio segment. For example, the user interface 600 can include controls allowing the user to select, for example, one of the labels 604 and play only that sound source corresponding to the selected label, thereby allowing the user to validate the identification of the selected sound source. For example, the user interface 600 can include controls allowing the user to select and modify a label of the labels 604. For example, assuming that the sound source 610 is that of a French horn, then the user can select the sound source 610 and change its label to "French Horn."

In an example, multiple labels may be assigned to a sound source. For example, the violin sound source may have associated to labels: "Violin" (as shown with the sound source 606) and a "Stringed Instrument" label (not shown). In an example, the user can assign multiple labels to a sound source. For example, in addition to the label "French Horn," the user can also add a label "Brass Instrument."

In an example, the user can assign a sound source to a diffuse audio component. A diffuse audio component is associated with a sound that does not have a specific direction. That is, the diffuse audio component includes one or more sounds that do not initiate from a specific direction in the scene.

Returning to FIG. 2, as mentioned above, the video frames 206 of the video 202 are input to the object classification 210. The object classification 210 is described with respect to FIG. 4.

Figure 4:
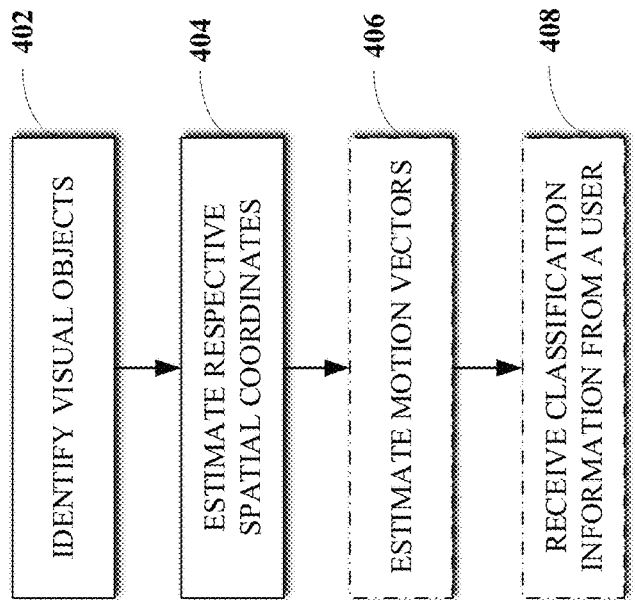
FIG. 4 is a flowchart of an example of a technique for visual classification according to implementations of this disclosure.

FIG. 4 is a flowchart of an example of a technique 400 for visual classification according to implementations of this disclosure. The technique 400 can be implemented by the object classification 210 of FIG. 2 or by the object recognizer 108 of FIG. 1.

The technique 400 includes classifying visual objects in the video frames 206; for each (or at least some) of the identified visual objects, estimating the coordinates of the object; for each (or at least some) of the identified visual objects, optionally estimating respective motion vectors; and for each (or at least some) of unclassified components, optionally receiving classification information from a user.

At 402, the technique 400 identifies objects in at least some of the frames of the video frames 206. The technique 400 can use an object recognizer to analyze at least some of the frames of the video frames 206 to identify the visual objects that are present in the scene.

In an example, the object recognizer can be a machine learning model that is trained to recognize many different objects in images. In an example, the object recognizer may not be implemented (e.g., performed) directly by the technique 400. Rather, the object recognizer can be a service that can be used (e.g., leveraged, called, etc.) by the technique 400. For example, the technique 400 can pass one or more frames of the video frames 206 to the service and receive information regarding the visual objects that the object recognizer identified.

Figure 7:
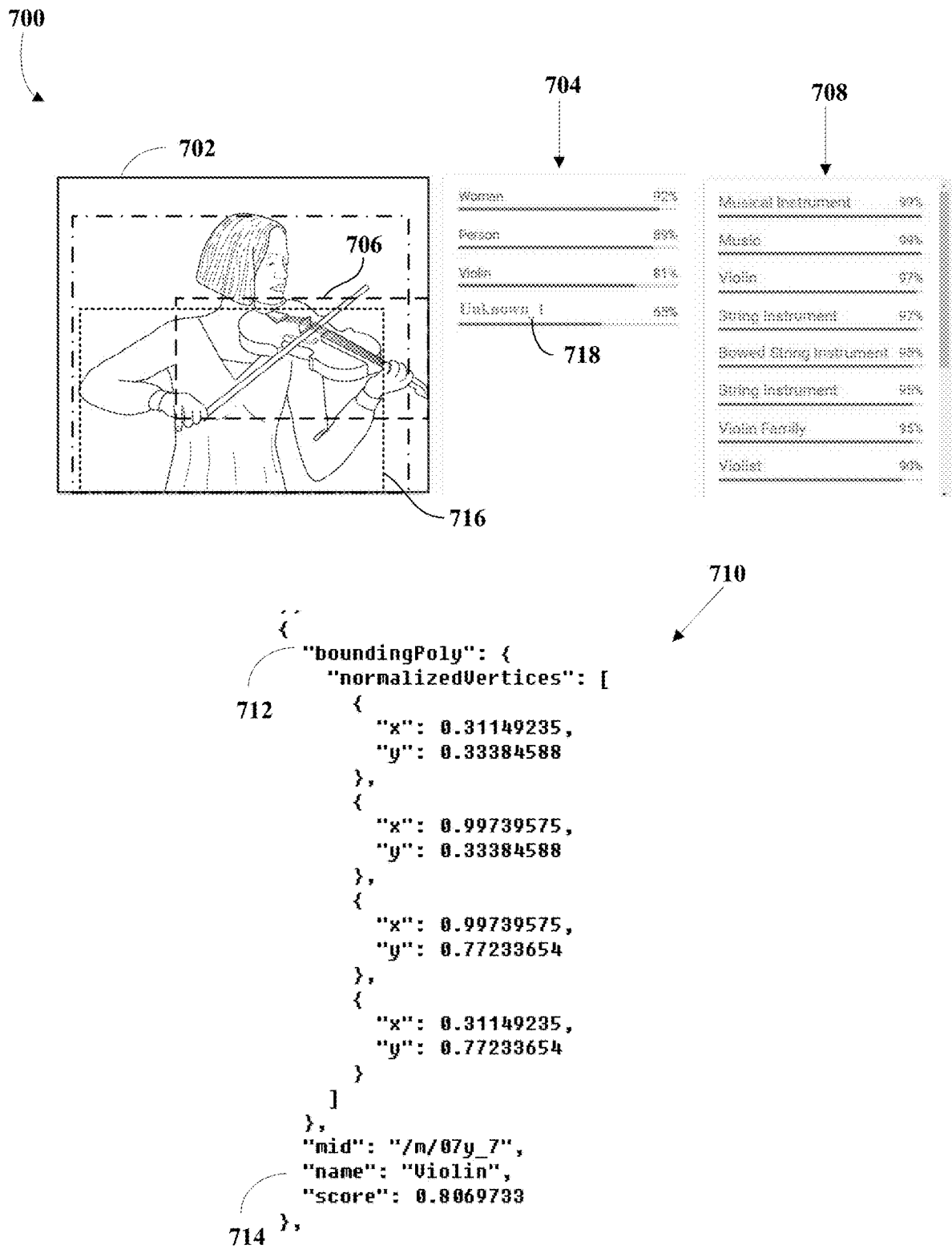
FIG. 7 illustrates an example of outputs of an object recognizer.

FIG. 7 illustrates an example 700 of outputs of an object recognizer. The example 700 illustrates the output of a Google Cloud image understanding service that is available at http://cloud.google.com/vision. The example 700 is merely that: an example. Other outputs and output formats can be received by the technique 400.

A frame 702 of the video frames 206 is presented to the object recognizer. The object recognizer identified objects of the frame 702 in a list 704. The object recognizer draws a bounding polygon (e.g., a box) around each of the identified objects. For example, a bounding polygon 706 is drawn around the violin. The object recognizer can also attach labels to the recognized objects, as shown in a list 708. In an example, each of the items in the list 704 and/or the list 708 can have an associated certainty. With respect to the violin, the object recognizer of the example 700 identified (in the list 708) the labels "Musical Instrument," "Violin," "String Instrument," "Bowed String Instrument," "String Instrument," and "Violin Family."

The technique 400 receives the data from the object recognizer in a machine-readable data structure that the technique 400 can operate on. A data structure 710 illustrates an example data structure that can be received by the technique 400 with respect to the Violin object. The data structure 710 in the JavaScript Object Notation (JSON) data-interchange format. However, other formats are possible. A bounding polygon 712 of the data structure 710 describes the bounding polygon coordinates of the violin. A label 714 is a human-readable label (i.e., "Violin") assigned to the object encompassed by the bounding polygon 712. It is not be noted that some of the recognized objects may not be sound sources.

In some situations, the object recognizer may mis-identify some objects. For example, the violin may have been recognized, and therefore labeled, as a "Cello." In some situations, the object recognizer may recognize that an object exists in the frame, but may not be able to classify (e.g., assign a label to) the object. For example, in the example 700, the clothing of the violin player of a bounding polygon 716 may be recognized as an object but are assigned a label 718 (i.e., "Unknown_1").

In an example, every $N^{th}$ frame of the video frames 206 can be analyzed to identify objects. That is, not every frame need be analyzed to identify objects. The value of N can be fixed for all video frames 206. For example, every $5^{th}$ frame can be analyzed. N can be any value (e.g., 1, 2, etc.). In an example, N depends on the type of video. For example, in video frames 206 that include a lot of motion (e.g., a sports video), more frames can be analyzed than in those videos that are fairly static (e.g., a video of a concert where the musicians do not move much on the stage).

Returning to FIG. 4, at 404, the technique 400 estimates respective spatial coordinates to at least some of the recognized objects. In an example, the respective centers of the bounding polygons are used. That is, for later assigning a sound location and/or direction to a sound, the center of the bounding polygon of the object that emits the sound is used as the source location of the sound. In other examples, different positions associated with the bounding polygons can be used.

In some implementations, the technique 400 can include a step of estimating motion vectors. That is, at 406, the technique 400 can estimate, for at least some of the recognized objects, respective motion vectors. Any suitable technique for estimating the motion vectors can be used. The motion vectors can be used to track how the location of a visual object (and, therefore, equivalently, the corresponding sound) changes over time. Estimating motion vectors can, generally, amount to determining differences between frames. For example, a dog may be identified in a first frame at a location that is centered at a first location and identified in a second frame at a location that is centered at a second location. Thus, the motion vector of the dog can be the difference (e.g., the displacement) between the first location and the second location.

In an example, the motion vectors can be used to assign sound locations to obscured objects. For example, in a first subset of the video frames 206, an object that is a sound source was visible. However, in a second subset of the video frames 206, the object became obscured but was still emitting the sound. The motion vector estimated for the object in the first subset of the frames (which may not necessarily be consecutive frames) can be used to assign one or more locations within the second subset of the video frames 206 to the object. In an example, if the object is obscured for an extended period of time, the sound event associated to the object can be assigned to the diffuse sound field.

In an example, the video frames 206 can be video frames of a spherical video. Thus, the motion vectors can be used to identify when an object moves from a first point of view (e.g., a view of a first camera) to a second point of view (e.g., a view of a second camera). Thus, the sound location can be moved for a location within the first view to a location of the second view. In another example, the object may move out of view of any of the points of view of the spherical camera yet may still be emitting a sound. The object can be assigned to the diffuse sound field.

In an example, no motion vectors are estimated. The sound locations associated with a sound source can be changed discretely (as opposed to continuously according to the motion vectors). For example, assume that in a sequence of 15 frames, the first frame and the $10^{th}$ frames are analyzed. An object is identified in the first frame at a first location and at a second location of the $10^{th}$ frame. The first location can be assigned as the sound source for frames 1-9 and the second location can be assigned as the sound source for frames 10-15. In another example, the sound locations can be assigned in each frame as in interpolation or extrapolation of the first location and the second location.

In an example, the technique 400 can optionally receive (at 408) classification information from a user.

For example, the technique 400 can, in a user interface, present to the user the list of identified and unidentified objects (visual objects). In the user interface, the user can select a label of an identified object. The user can modify labels assigned to some of the identified objects. The user interface can be similar to that described with respect to FIG. 7. In an example, the user interface can include controls allowing the user to move forward and backwards in the video frames 206. The user interface can include bounding polygons. In an example, the user interface can include unidentified objects (if any). The user can select an unidentified object and assign one or more labels to the unidentified objects. In an example, unidentified objects can be assigned the label "unknown" (or some other label indicating that the visual object could not classified). In an example, the user can draw a bounding polygon around an area of the frame to identify an object and assign one or more labels to the object that is identified by the user.

Figure 5:
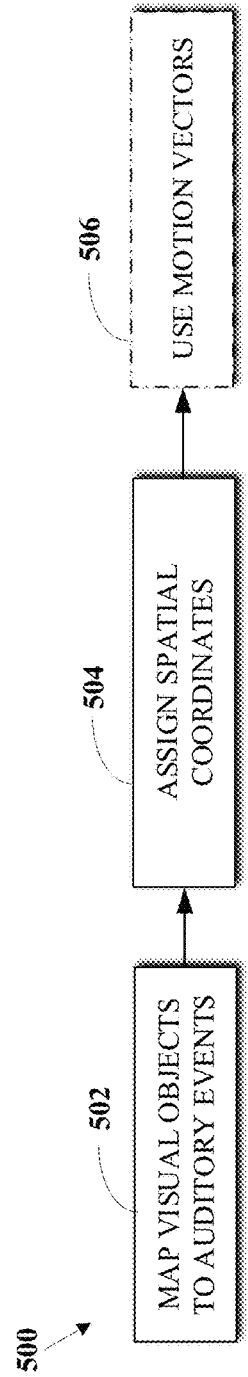
FIG. 5 is a flowchart of an example of a technique for matching audio and visual objects according to implementations of this disclosure.

Returning again to FIG. 2, the results of the audio classification 208 and the object classification 210 are combined in a matching 212. The matching 212 can be implemented by the matcher 110 of FIG. 1. The matching 212 is described with respect to FIG. 5. FIG. 5 is a flowchart of an example of a technique 500 for matching audio and visual objects according to implementations of this disclosure. The technique 500 can be implemented by the matching 212 of FIG. 2 or by the matcher 110 of FIG. 1.

At 502, the technique 500 maps auditory objects to visual objects, or vice versa. In an example, the technique 500 can start with an automatic process of matching the identified audio objects to the identified visual objects.

The auditory objects and the visual objects can be mapped using string matching. For example, the sound source 606 of FIG. 6 can be mapped to the object represented by data structure 710 of FIG. 7 because both objects (i.e., the auditory and the visual objects) are labeled "Violin." The audio and the visual objects can be mapped using semantic matching. For example, assume that the violin of FIG. 6 was identified only as "Bowed String Instrument." A taxonomy can be used to identify that a "Violin" is a type of "Bowed String Instrument." Thus, the technique 500 can map the auditory object Violin to the visual object "Bowed String Instrument." Other ways of automatically mapping the visual objects to the auditory objects are possible.

Other heuristics can be used to identify mappings between auditory and visual objects. For example, a mapping can be identified based on a size of a visual object and a frequency of a sound source. For example, the object classification 210 of FIG. 2 may have identified an object as a "Car" when, in fact the object is a truck. If the spectrum of the audio includes a low frequency component (which is consistent with the sound profile of a truck), and since Car and truck are semantically linked (e.g., they are both example of vehicles), the object identified as "Car" can be matched (i.e., mapped) to the sound source corresponding to the low frequency.

In an example, the technique 500 can assign unmatched objects to the diffuse sound signal and/or assign an unmatched audio event to a residual audio signal. The residual audio signal can correspond to the set of unmatched audio events. As described below, the residual audio signal can be presented to a user so that the user can decide a disposition of the audio events of the residual audio signal.

In an example, partial spatial information from a stereophonic recording can be used to rule-out obvious misclassification cases. For example, an auditory event in the left panorama cannot have a visual representation in the right hemisphere.

In some situations, an automatic matching may not be accurate (i.e., a mismatch) or a match that should have been made was not (i.e., an unmatch). The mismatches and/or unmatches can be resolved using user intervention. For example, the technique 500 can present to the user a user interface via which the user can browse through the available visual objects and determine whether any of the auditory objects can be better matched to visual objects. The user can assign a sound event to the diffuse sound field. The user can assign a sound event to a direction (e.g., location) without assigning the sound to a visual event. The user can map a sound event to a visual object.

At 504, for each of the mapped auditory events, the technique 500 assigns spatial coordinates to the mapped auditory event. For example, the auditory event can be assigned the coordinates that are the center of the bounding polygon of the matched visual object.

At 506, The technique 500 can optionally use motion vectors and/or interpolation to estimate the most probable current direction of obscured objects, as described above. An obscured object can be an visual object that is in the scene but is obscured by other objects in the scene. An obscured object can be an visual object that has exited the scene.

In an example, for an auditory event (mapped or unmapped), the user can assign a screen location (e.g., a point in a frame of the video frames 206) that is to be assigned as the source (i.e., location) of the sound event. The user can also select a different frame and select another location as the source auditory event. Locations of the auditory event in each of the frames between the first frame and the second frame can be assigned as described above.

Returning to FIG. 2, spatial information 214 are generated (e.g., output).

The audio spatializer 112 of FIG. 1 uses the audio signals with the extracted spatial metadata (e.g., the spatial locations) to spatialize and upmix the audio events to generate spatial audio. For example, one of the approaches described above (e.g., object-based, channel-based, or scene-based approach) can be used.

For example, using the scene-based approach (i.e., Higher Order Ambisonic reproduction), each directional audio event is spatialized (i.e., encoded into HOA representation with the required order); and all spatialized audio events are mixed together into a single sound field representation. In such a spatial audio representation, sound events can be represented in terms of spherical harmonic functions. For example, each of the HOA signals can be composed of the extracted (e.g., isolated, etc.) monophonic audio signal corresponding to the sound event and weighted by spherical harmonic functions, which are evaluated at the angles corresponding to desired sound event's locations.

Any remaining residual audio signal can be assumed to be a diffuse (i.e., non-directional) audio stream. The remaining residual audio signal can be processed separately from the directional audio streams. The diffuse field synthesizer 114 of FIG. 1 processes the remaining residual audio signal. Any number of available techniques can be used to process the remaining residual audio signal as a diffuse sound field. In an example, the diffuse audio stream can be passed through several decorrelation filters (for example, using Temporarily Diffuse Impulses) and equally added to the above described HOA channels.

Each decorrelated diffuse audio stream can be added to the previously encoded directional audio streams. As such, the spatial information 214 can include one omnidirectional and N–1 (each corresponding to directional sound event) directional channels.

Figure 8:
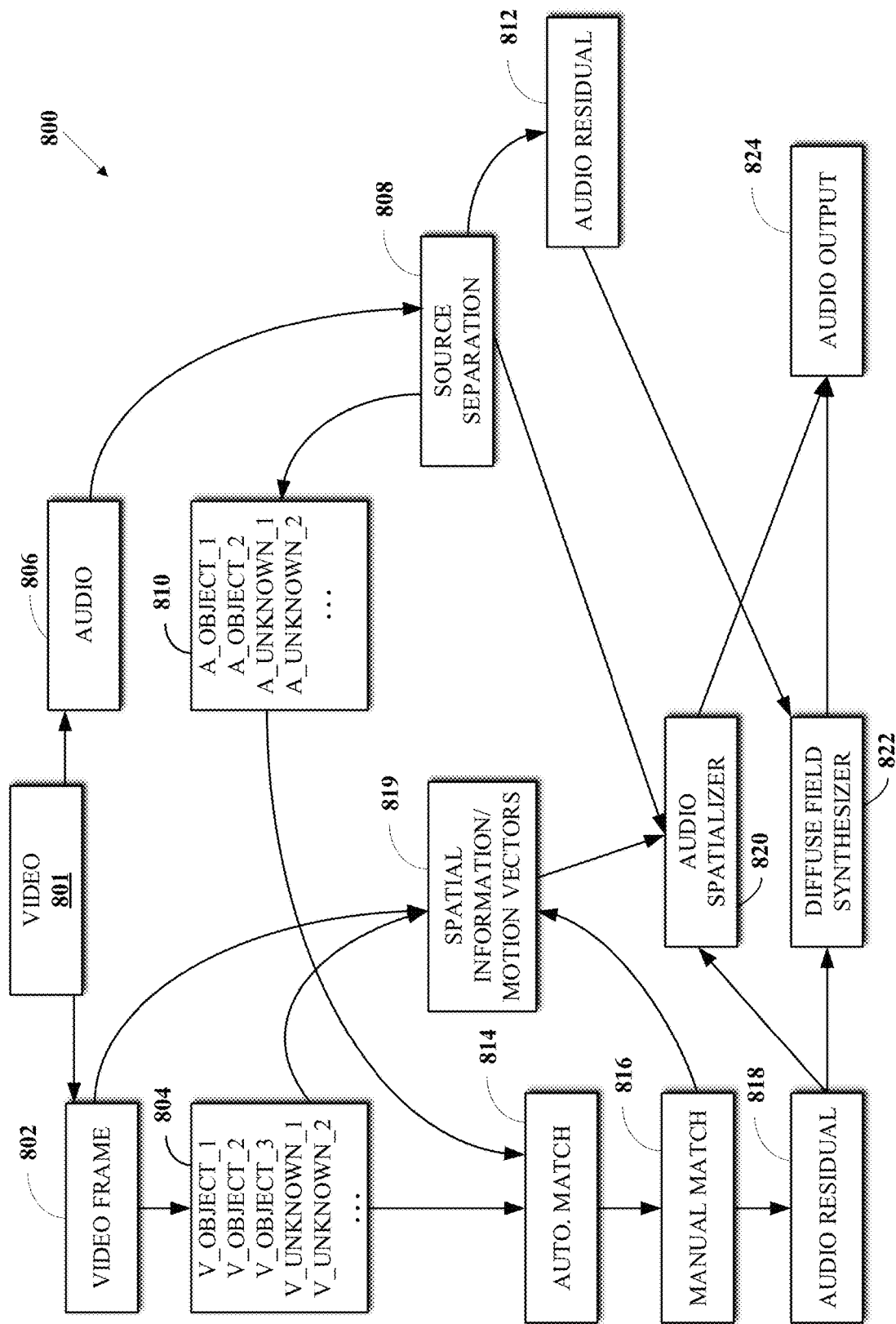
FIG. 8 is an example of a flowchart of a technique for video-informed spatial audio expansion according to implementations of this disclosure.

FIG. 8 is an example of a flowchart of a technique 800 for video-informed spatial audio expansion according to implementations of this disclosure. The technique 800 presents another view and/or elaborations of the steps described above with respect to FIGS. 1-7. The technique 800 can be implemented by a system, such as the system 100 of FIG. 1.

A video 801 containing video frames 802 (i.e., a visual stream) and an audio segment 806 is received. The video 801 is demultiplexed to obtain the video frames 802 and the audio segment 806. In an example, the video frames 802 and the audio segment 806 can be corresponding portions of the video 801. For example, the video frames 802 and the audio segment 806 can be a portion of the video 801 constituting a scene of the video 801.

A list of visual objects 804 can be obtained from a frame of the video frames 802, as described above with respect to the object classification 210 of FIG. 2. The list of visual objects 804 includes labels for the identified objects. The list of visual objects 804 may not include a label for each of the visual objects of the frame. Additionally, a label may not be identified for an visual object. The list of visual objects 804 is illustrated as including identified and labeled visual objects (e.g., V_OBJECT_1, V_OBJECT_2, and V_OBJECT_3), and identified but unlabeled visual objects (e.g., V_UNKNOWN1 and V_UNKNOWN_2). As described above, the user can add labels, modify labels, and/or delete labels from the list of visual objects 804.

As described above, motion vectors and/or spatial information 819 can be obtained using the video frames 802 and the list of visual objects 804. For example, the centers of the respective bounding polygons of the objects of the list of visual objects 804 can be used as the spatial information associated with the visual objects.

A list of auditory events (i.e., a list of auditory objects 810) can be obtained from the of the audio segment 806. As described above, the audio segment 806 can be presented to a source separation module 808. Each of the separated sound sources can then be presented for classification, as described above audio classification 208 of FIG. 2. The classified objects are collected in the list of auditory objects 810. The list of auditory objects 810 includes labels for the identified objects (i.e., identified sounds). The list of auditory objects 810 may not include a label for each of the auditory objects of the audio segment 806. Additionally, a label may not be identified for an auditory event. The list of auditory objects 810 is illustrated as including identified and labeled auditory events (e.g., A_OBJECT_1 and A_OBJECT_2), and identified but unlabeled auditory events (e.g., A_UNKNOWN_1 and A_UNKNOWN_2). As described above, the user can add labels, modify labels, and/or delete labels from the list of auditory objects 810. Audio events that do not have specific sources in the audio segment 806 can be assigned to a residual audio signal 812.

The list of visual objects 804 and the list of auditory objects 810 are provided (e.g., input, etc.) for an automatic matching 814 (i.e., automated matching). Automatic matching can be performed as described above with respect to the matching 212 of FIG. 2.

As described above, a manual match 816 can be performed by the user. For example, the user can map a mapped auditory object of the list of auditory objects 810 to a different visual object of the list of visual objects 804. For example, the user can map an unmapped auditory object to a visual object. For example, the user can assign spatial coordinates (e.g., a location) to an audio source (e.g., an auditory event). This can be useful, for example, if the visual object corresponding to the auditory event was not identified by the object recognizer, yet the user is certain that the visual object is the source of the auditory event. For example, the user can unmap a mapped auditory object and assign it to the diffuse sound field.

After the automatic matching 814 and the manual match 816, there may still be some auditory objects that are not mapped to any visual objects in the video frames 802. Such objects are referred to as the audio residual 818. The audio residual 818 can include first auditory events that correspond to objects that may not be visible in the scene but originate from specific directions. The audio residual 818 can include second auditory events that do not originate from specific directions and are thus diffuse sounds. Thus, the user selects which of the auditory events of the audio residual 818 are directional sound events and which are diffuse sounds. The user can assign out-of-view directional locations to at least some of the first auditory events.

Any directional sounds are provided to an audio spatializer 820. The audio spatializer 820 can spatialize some of the auditory events, which are identified as directional auditory events, using the motion vectors and/or spatial information 819 according to a spatialization approach (e.g., object-based, channel-based, or scene-based approach). The audio spatializer 820 can use the directional locations provided by the user with respect to the first auditory events.

Any auditory events identified as diffuse sound events in the residual audio signal 812 and the audio residual 818 are processed by a diffuse field synthesizer 822, as described above. The outputs of the audio spatializer 820 and the diffuse field synthesizer 822 are combined into an audio output 824. For example, the audio output 824 can be a stereo file, a multi-channel file, or a scene-based representation (e.g., Ambisonics), an object representation file, or the like. In some situations, saving to a stereo file (i.e., in a stereophonic format) can be an improvement over a source (e.g., an original) monophonic audio recording. For example, consider a musical concert that is captured as a monophonic recording. The video-informed spatial expansion described herein can help in moving the musicians (i.e., the sound events of the musicians) in a stereo panorama resulting in a stereo music output. Even though, as described above, stereo may misrepresent certain sound events, the stereophonic output can still be an improvement over mono music recording. Binaural stereo, which encodes 360 information into two channels but requires playback over headphones (or loudspeakers but without inter-channel cross-talk) can be another example where saving in stereo format can be beneficial over an original monophonic recording.

Figure 9:
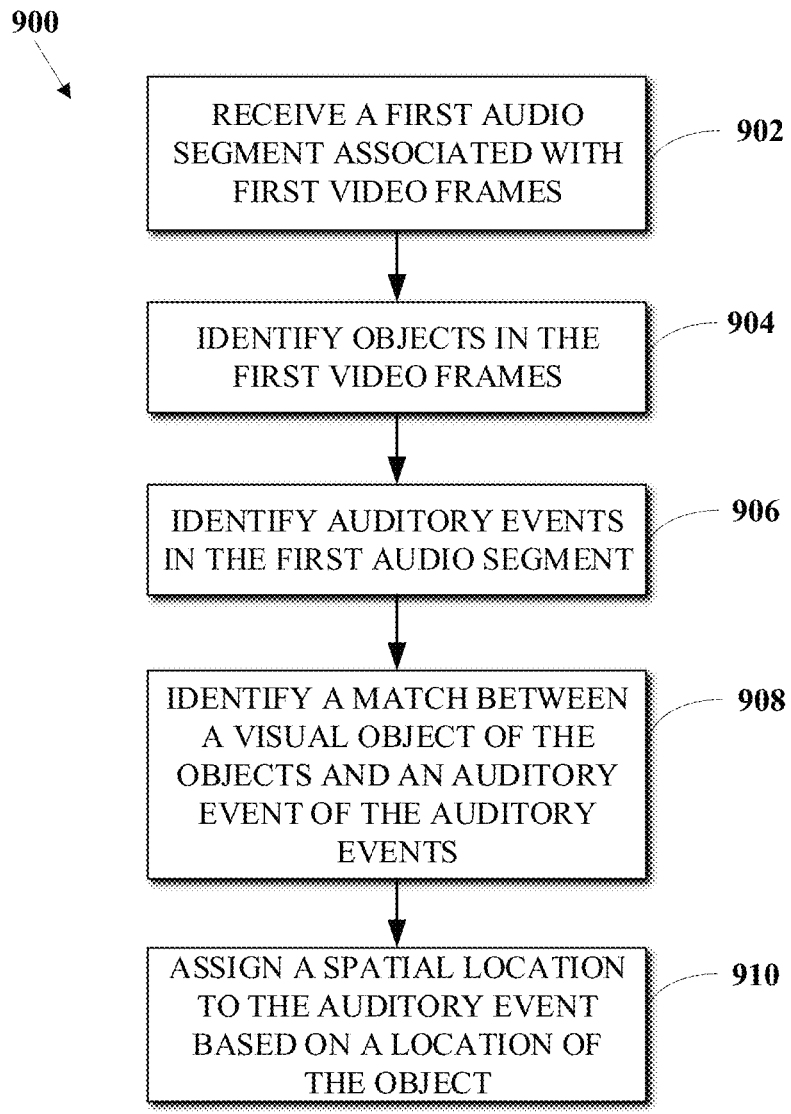
FIG. 9 is a flowchart of an example of a technique for assigning spatial information to audio segments.

FIG. 9 is a flowchart of an example of a technique 900 for assigning spatial information to audio segments. At least some aspects of the technique 900 can be implemented by one or more of the modules of the system 100 of FIG. 1. At least some aspects of the technique 900 can be implemented partially or fully as described with respect to FIG. 2.

The technique 900 receives a monophonic audio segment and assigns spatial information to at least one auditory event of the audio segment. The technique 900 uses visual information in video frames corresponding to the audio segment to assign the spatial information.

At 902, the technique 900 receives a first audio segment. The first audio segment is non-spatialized. That is, no spatial information is available with respect to any auditory events in the first audio segment. The first audio segment is associated with first video frames.

The first audio segment can be received in any number of ways, such as by receiving the first audio segment over a network, over a cable, or by reading the audio segment from a primary memory or other storage device, including a disk drive or removable media such as a CompactFlash (CF) card, Secure Digital (SD) card, or the like. The first audio segment can be received in a stream (e.g., a file) that includes both the first audio segment and the first video frames. In an example, the audio and video tracks of the stream can be demultiplexed. The first audio segment and the first video frames can correspond to a scene of the stream. In an example, the video can be spherical video.

At 904, the technique 900 identifies visual objects in the first video frames. The visual objects can be identified by an object recognizer module, such as the object recognizer 108 of FIG. 1. The visual objects can be identified as described with respect to the object classification 210 of FIG. 2. In an example, identifying the visual objects can include using image recognition to identify the visual objects in the first video frames.

At 906, the technique 900 identifies auditory events in the first audio segment. The auditory events can be identified by audio classifier 106, such as the audio classifier 106 of FIG. 1. The auditory events can be identified as described with respect to the audio classification 208 of FIG. 2. In an example, identifying the auditory events can include using blind source separation to identify the auditory events in the first audio segment by decomposing the first audio segment into multiple tracks, each corresponding to an auditory event.

At 908, the technique 900 identifies a match between a visual object of the visual objects and an auditory event of the auditory events. The match can be automatically identified, such as described with respect to the automatic matching 814 of FIG. 8. The match can be manually identified, such as described with respect to the manual match 816 of FIG. 8.

At 910, the technique 900 assigns a spatial location to the auditory event based on a location of the visual object. The spatial location can be assigned as described to the audio spatializer 820 of FIG. 8.

In an example, the technique 900 can include generating an audio output comprising the auditory event and the spatial location of the auditory event, as described with respect to the spatial information 214 of FIG. 2 or the audio output 824 of FIG. 8.

In an example, the technique 900 can include identifying an unmatched auditory event; and presenting the unmatched auditory event in a user interface. The unmatched auditory event can be an auditory event that is not matched to an identified visual object in the first video frames. For example, the unmatched auditory event can be an auditory event of the audio residual 818 of FIG. 8. In an example, the unmatched auditory event can be an unmatched auditory event or a mismatched auditory event, as described with respect to the manual match 816 of FIG. 8. Thus, in an example, the technique 900 can include receiving, from a user, an assignment (i.e., a mapping) of the unmatched auditory event to a visual object of the visual objects identified in the first video frames.

In an example, the technique 900 can include receiving, from a user, an indication to assign the unmatched audio event as diffuse sound. The indication can be a user input. The user can assign the unmatched audio event to the diffuse sound field as described with respect to the audio residual 818 of FIG. 8.

In an example, the technique 900 can include receiving, from a user, an indication to assign an unmatched auditory event of the unmatched sounds as directional sound and a spatial direction for the unmatched auditory event, as described with respect to the audio residual 818 of FIG. 8.

In an example, the technique 900 can include receiving a second audio segment that includes the auditory event; receiving second video frames that do not include the visual object; determining a motion vector of the visual object based at least in part on at least a subset of the first video frames; and assigning an ambient spatial location to the auditory event based on the motion vector.

In an example, the technique 900 can include receiving a second audio segment that includes the auditory event; receiving second video frames that do not include the visual object; and assigning, based a time difference between the first video segments and the second video segments, one of an ambient spatial location or a diffuse location to the auditory event. For example, consider a scenario where a person, who is speaking and visible in a scene, has gone out of view but is still speaking. The longer that the person remains out of view, the less predictable the person's location can become. For example, while initially motion vectors can be used to estimate the person's location when the person goes out of view, the motion vectors can not reasonably be used to continue to predict the person's location after a longer period of time. For example, while the person initially existed the view on the left of the scene, the person may have gone around (e.g., behind) the camera, hid behind a curtain, or the like. Thus, after a certain period of time (e.g., 2 seconds, etc.), the sound of the person can be assigned to the diffuse sound field.

Figure 10:
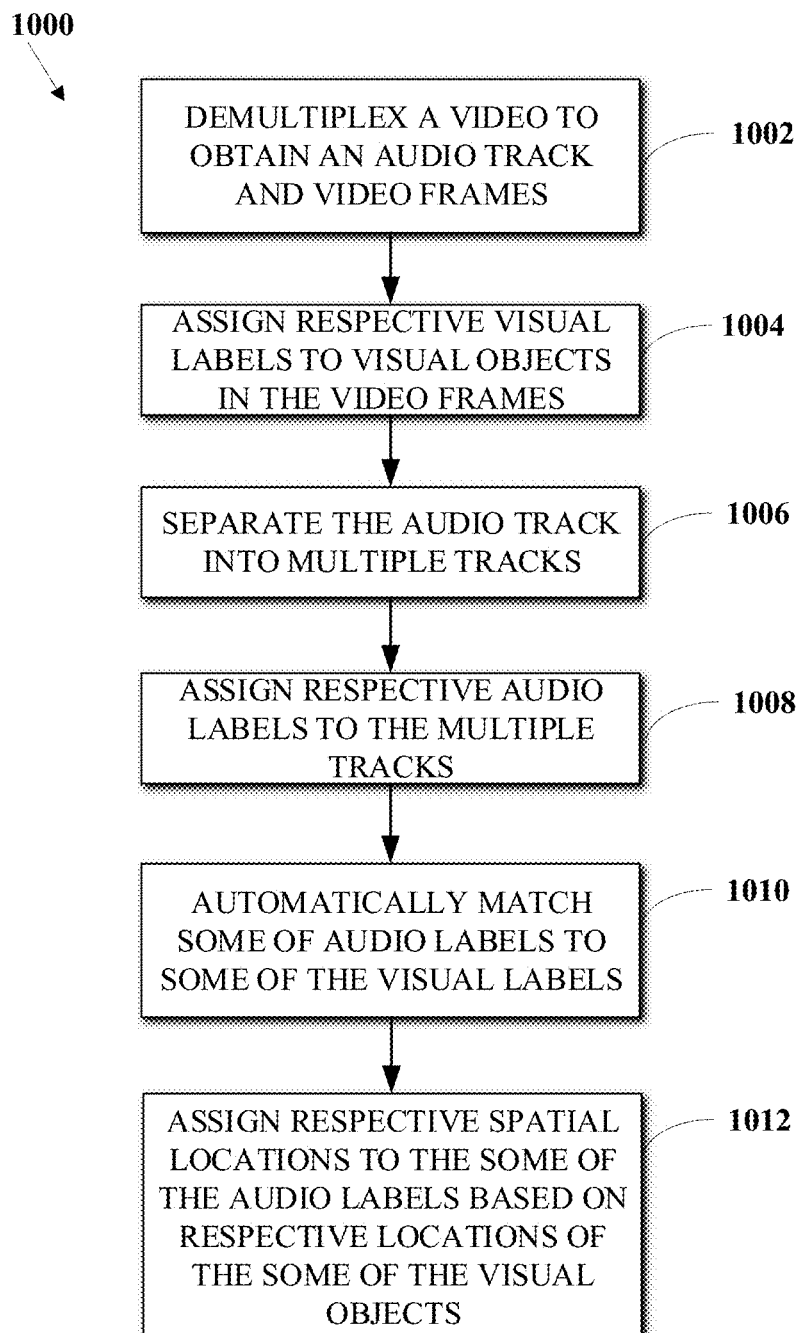
FIG. 10 is a flowchart of another example of a technique for assigning spatial information to audio segments.

FIG. 10 is a flowchart of another example of a technique 1000 for assigning spatial information to audio segments. At least some aspects of the technique 1000 can be implemented by one or more of the modules of the system 100 of FIG. 1. At least some aspects of the technique 1000 can be implemented partially or fully as described with respect to FIG. 2.

The technique 1000 receives a monophonic audio segment and assigns spatial information to at least one auditory event of the audio segment. The technique 1000 uses visual information in video frames corresponding to the audio segment to assign the spatial information.

At 1002, the technique 1000 demultiplexes the video to obtain an audio track and video frames, as described above. At 1004, the technique 1000 assigns respective visual labels to visual objects in the video frames. In an example, the technique 1000 uses image recognition and/or object classification to assign the visual labels. At 1006, the technique 1000 separates the audio track into multiple tracks. In an example, the technique 1000 uses source separation (such as Blind Audio Source Separation) to obtain the multiple tracks. At 1008, the technique 1000 assigns respective audio labels to the multiple tracks. In an example, and as described above, the technique 1000 can use an audio classifier, such as the audio classifier 106 to assign the respective audio labels.

At 1010, the technique 1000 automatically matches at least some of the audio labels to some of the visual labels, as described above with respect to the automatic matching 814 of FIG. 8. At 1012, the technique 1000 assigns respective spatial locations to the some of the audio labels based on respective locations of the some of the visual objects, as described above with respect to the motion vectors and/or spatial information 819 of FIG. 8.

In an example, the technique 1000 can include identifying residual tracks corresponding to unmatched audio labels; and displaying, to a user, the residual tracks in a display. In an example, the technique 1000 can include receiving, from the user, at least one of: a first assignment of a residual track of the residual tracks to a diffuse sound field; a second assignment of the residual track to an arbitrary spatial location of the video frames; a third assignment of the residual track as an ambient sound; or a fourth assignment of the residual track to a visual object in the video frames.

Figure 11:
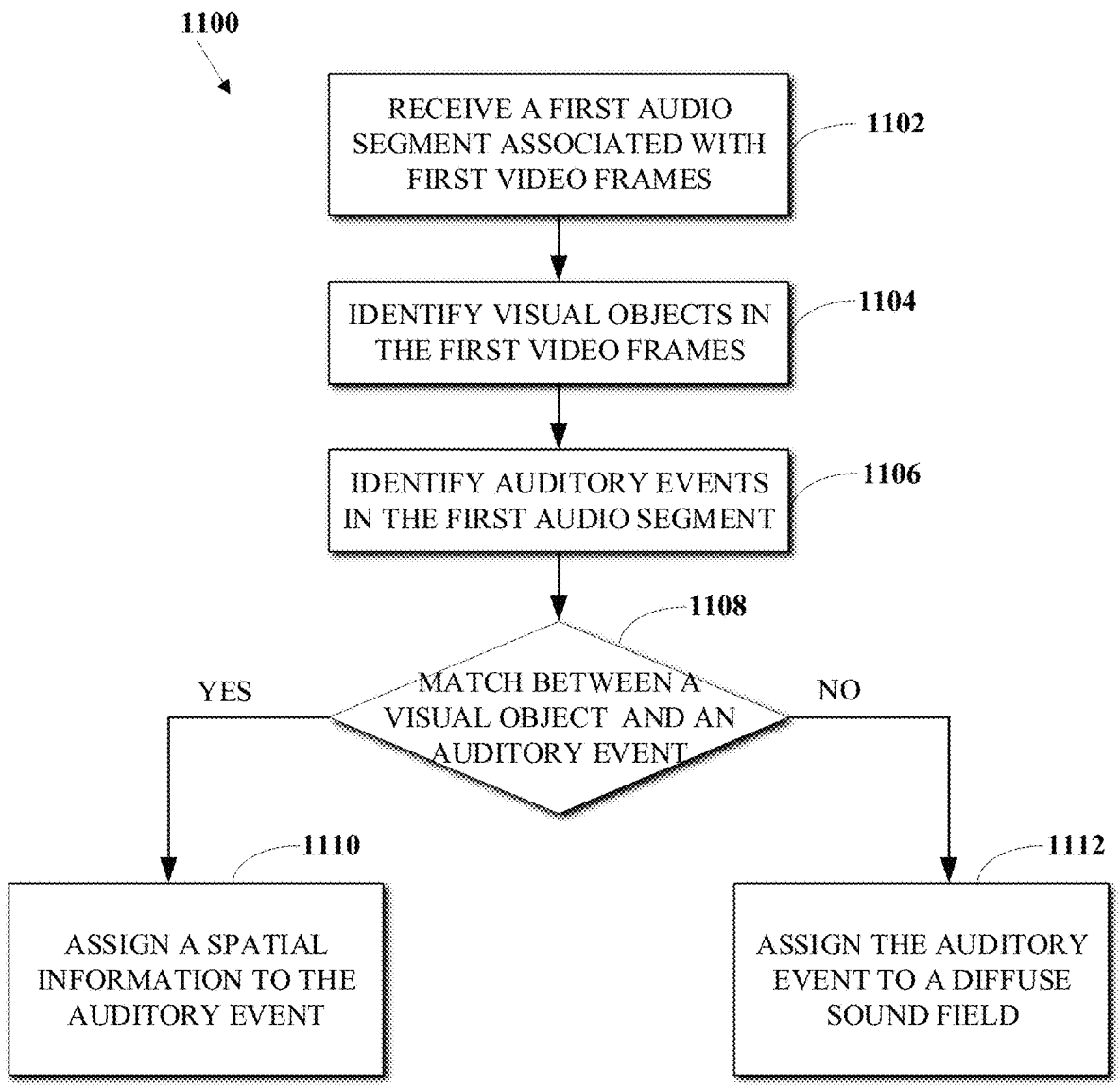
FIG. 11 is a flowchart of yet another example of a technique for assigning spatial information to audio segments.

FIG. 11 is a flowchart of yet another example of a technique 1100 for assigning spatial information to audio segments. At least some aspects of the technique 1100 can be implemented by one or more of the modules of the system 100 of FIG. 1. At least some aspects of the technique 1100 can be implemented partially or fully as described with respect to FIG. 2.

As 1102, the technique 1100 receives a first audio segment that is non-spatialized and is associated with first video frames. The first audio segment can be a monophonic audio segment. The first audio segment can be received as described with respect to 902 of FIG. 9. At 1104, the technique 1100 identifies visual objects in the first video frames. Identifying the visual objects can be as described with respect to 904 of FIG. 9. At 1106, the technique 1100 identifies auditory events in the first audio segment. Identifies the auditory events can be as described with respect to 906 of FIG. 9.

At 1108, the technique 1100 determines whether there is a match between a visual object of the visual objects and an auditory event of the auditory events. If there is a match, the technique 1100 proceeds to 1110 to assign a spatial information to the auditory event. If there is no match, the technique 1100 proceeds to 1112 to assign the auditory event to a diffuse sound field.

In an example, assigning the spatial information to the auditory event can include assigning a spatial location to the auditory event based on a location of the visual object. In an example, the spatial location can be a center of a bounding polygon of the visual object, as described above with respect to 504 of FIG. 5.

In an example, the technique 1100 can include generating an audio file that includes the auditory event and the spatial location of the auditory event. In an example, generating the audio file can include generate an audio file that includes the auditory event and diffuse sound information related to the auditory event. Generating the audio file can be as described with respect to the audio output 824 of FIG. 8.

For simplicity of explanation, the techniques 200, 300, 400, 500, 800, 900, 1000, and 1100 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the system 100 (and the algorithms, methods, instructions, etc., stored thereon and/or executed thereby, including the techniques 200, 300, 400, 500, 800, 900, 1000, and/or 1100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the system 100 do not necessarily have to be implemented in the same manner.

Further, in one aspect, for example, the system 100 can be implemented using a computer or processor with a computer program that can be stored as instruction in a memory and that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of assigning spatial information to audio segments, comprising:
    receiving a first audio segment, wherein the first audio segment is non-spatialized, and wherein the first audio segment is associated with first video frames;
    identifying visual objects in the first video frames;
    identifying auditory events in the first audio segment;
    identifying a match between a visual object of the visual objects and an auditory event of the auditory events;
    assigning a first spatial location to the auditory event based on a location of the visual object, wherein the first spatial location indicates coordinates of a point within a bounding box surrounding the visual object;
    receiving a second audio segment, wherein the second audio segment includes the auditory event of the auditory events;
    receiving second video frames, wherein the second video frames do not include the visual object;
    in response to determining that the second video frames do not include the visual object and that a first time difference between the first video frames and the second video frames does not exceed a certain time, using a motion vector of the visual object to assign a second spatial location to the auditory event in at least one of the second video frames;

receiving a third audio segment, wherein the third audio segment includes the auditory event;

receiving third video frames, wherein the third video frames do not include the visual object;

in response to determining that the third video frames do not include the visual object and that a second time difference between the first video frames and the third video frames exceeds the certain time, assigning the auditory event to a diffuse sound field; and generating an audio output by upmixing the auditory event and the first spatial location, the second spatial location, and the diffuse sound field into a spatial representation, wherein the audio output conveys spatial locations of the audio output to a listener.

2. The method of claim 1, further comprising:
identifying an unmatched auditory event, wherein the unmatched auditory event is not matched to an identified visual object in the first video frames; and
presenting the unmatched auditory event in a user interface.

3. The method of claim 2, further comprising:
receiving, from a user, an assignment of the unmatched auditory event to another visual object of the visual objects identified in the first video frames.

4. The method of claim 2, further comprising:
receiving, from a user, an indication to assign the unmatched auditory event as diffuse sound.

5. The method of claim 2, further comprising:
receiving, from a user, an indication to assign the unmatched auditory event as directional sound and a spatial direction for the unmatched auditory event.

6. The method of claim 1, wherein the first video frames are frames of a spherical video.

7. The method of claim 1, wherein the first audio segment is monophonic.

8. The method of claim 1, wherein identifying the auditory events in the first audio segment comprises:
using blind source separation to identify the auditory events in the first audio segment by decomposing the first audio segment into multiple tracks, each corresponding to a respective auditory event.

9. The method of claim 1, wherein identifying the visual objects in the first video frames comprises:
using image recognition to identify the visual objects in the first video frames.

10. The method of claim 1, wherein the audio output is a multi-channel file, an Ambisonics file, in a stereophonic format, or a Binaural stereo file.

11. A system for assigning spatial information to audio segments, comprising:
a memory; and
a processor, the processor configured to execute instructions stored in the memory to:
receive a first audio segment,
wherein the first audio segment is non-spatialized, and
wherein the first audio segment is associated with first video frames;
identify visual objects in the first video frames;
identify auditory events in the first audio segment;
in response to identifying a match between a visual object of the visual objects and an auditory event of the auditory events, assign a first spatial information to the auditory event;
in response to not identifying the match, assign the auditory event to a diffuse sound field;
receive a second audio segment, wherein the second audio segment includes the auditory event of the auditory events;
receive second video frames, wherein the second video frames do not include the visual object;
use a motion vector of the visual object to assign a second spatial information to the auditory event in at least one of the second video frames;
receive a third audio segment, wherein the third audio segment includes the auditory event;
receive third video frames, wherein the third video frames do not include the visual object;
assign the auditory event to the diffuse sound field based on a condition related to a distance between the first video frames and the third video frames; and
generate an audio output by upmixing the auditory event and the first spatial information, the second spatial information, and the diffuse sound field into a spatial representation, wherein the audio output conveys the spatial information or the diffuse sound field to a listener of the audio output.

12. The system of claim 11, wherein to assign the first spatial information to the auditory event comprises to:
assign a spatial location to the auditory event based on a location of the visual object.

13. The system of claim 12, wherein the spatial location corresponds to a center of a bounding polygon of the visual object.

14. The system of claim 12, wherein the instructions further include instructions to:
generate an audio file that includes the auditory event and the spatial location of the auditory event.

15. The system of claim 11, wherein the instructions further include instructions to:
generate an audio file that includes the auditory event and diffuse sound information related to the auditory event.

16. A non-transitory computer-readable storage medium, comprising executable instructions that, when executed by a processor, facilitate performance of operations, comprising:
receiving a first audio segment,
wherein the first audio segment is non-spatialized, and
wherein the first audio segment is associated with first video frames;
identifying visual objects in the first video frames;
identifying auditory events in the first audio segment;
in response to identifying a match between a visual object of the visual objects and an auditory event of the auditory events, assigning a first spatial information to the auditory event;
in response to not identifying the match, assigning the auditory event to a diffuse sound field;
receiving a second audio segment, wherein the second audio segment includes the auditory event of the auditory events;
receiving second video frames, wherein the second video frames do not include the visual object;
using a motion vector of the visual object to assign a second spatial information to the auditory event in at least one of the second video frames;
receiving a third audio segment, wherein the third audio segment includes the auditory event;

receiving third video frames, wherein the third video frames do not include the visual object;

assigning the auditory event to the diffuse sound field based on a condition related to a distance between the first video frames and the third video frames; and generating an audio output by upmixing the auditory event and the first spatial information, the second spatial information, and the diffuse sound field into a spatial representation, wherein the audio output conveys the spatial information or the diffuse sound field to a listener of the audio output.

17. The non-transitory computer-readable storage medium of claim 16, wherein assigning the first spatial information to the auditory event comprises:

assigning a spatial location to the auditory event based on a location of the visual object.

18. The non-transitory computer-readable storage medium of claim 17, wherein the spatial location corresponds to a center of a bounding polygon of the visual object.

19. The non-transitory computer-readable storage medium of claim 17, wherein the operations further comprise:

generating an audio file that includes the auditory event and the spatial location of the auditory event.

20. The non-transitory computer-readable storage medium of claim 16, wherein the operations further comprise:

generating an audio file that includes the auditory event and diffuse sound information related to the auditory event.

* * * * *